(12) United States Patent
Huang et al.

(10) Patent No.: US 7,550,413 B2
(45) Date of Patent: Jun. 23, 2009

(54) FLUID LOSS CONTROL AGENTS FOR VISCOELASTIC SURFACTANT FLUIDS

(75) Inventors: Tianping Huang, Spring, TX (US); James B. Crews, Willis, TX (US); James H. Treadway, Jr., Magnolia, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/755,581

(22) Filed: May 30, 2007

(65) Prior Publication Data
US 2008/0060812 A1    Mar. 13, 2008

Related U.S. Application Data

(63) Continuation-in-part of application No. 11/125,465, filed on May 10, 2005.

(60) Provisional application No. 60/815,693, filed on Jun. 22, 2006, provisional application No. 60/570,601, filed on May 13, 2004.

(51) Int. Cl.
*C09K 8/76* (2006.01)
*E21B 43/26* (2006.01)

(52) U.S. Cl. .............. 507/240; 507/241; 507/244; 507/245; 507/265; 507/269; 507/270; 507/271; 507/272; 507/275

(58) Field of Classification Search .................. None
See application file for complete search history.

(56) References Cited

U.S. PATENT DOCUMENTS

| | | | | |
|---|---|---|---|---|
| 1,991,637 A | * | 2/1935 | Harth | 507/140 |
| 2,219,312 A | * | 10/1940 | Hayward et al. | 175/66 |
| 4,318,732 A | * | 3/1982 | Sawyer, Jr. | 71/64.8 |
| 4,374,737 A | * | 2/1983 | Larson et al. | 507/130 |
| 4,620,596 A | | 11/1986 | Mondshine | |
| 4,735,731 A | | 4/1988 | Rose et al. | |
| 4,931,195 A | * | 6/1990 | Cao et al. | 510/304 |
| 5,036,919 A | | 8/1991 | Thomas et al. | |
| 5,964,295 A | | 10/1999 | Brown et al. | |
| 6,342,467 B1 | | 1/2002 | Chang et al. | |

(Continued)

OTHER PUBLICATIONS

U.S. Appl. No. 11/608,035, Huang.

(Continued)

*Primary Examiner*—James Seidleck
*Assistant Examiner*—John J Figueroa
(74) *Attorney, Agent, or Firm*—David L. Mossman (57) ABSTRACT

Alkaline earth metal compounds may be fluid loss control agents for viscoelastic surfactant (VES) fluids used for well completion or stimulation in hydrocarbon recovery operations. The VES fluid may further include proppant or gravel, if it is intended for use as a fracturing fluid or a gravel packing fluid, although such uses do not require that the fluid contain proppant or gravel. The fluid loss control agents may include, but not be limited to, oxides and hydroxides of alkaline earth metal, and in one case magnesium oxide where the particle size of the magnesium oxide is between 1 nanometer to 0.4 millimeter. The fluid loss agent appears to associate with the VES micelles and together form a novel pseudo-filter cake crosslinked-like viscous fluid layer that limits further VES fluid flow into the porous media. The fluid loss control agent solid particles may be added along with VES fluids.

7 Claims, 7 Drawing Sheets

U.S. PATENT DOCUMENTS

| | | | |
|---|---|---|---|
| 6,576,597 B2 * | 6/2003 | Dobson et al. | 507/111 |
| 6,605,570 B2 | 8/2003 | Miller et al. | |
| 6,613,720 B1 * | 9/2003 | Feraud et al. | 507/200 |
| 6,762,154 B2 | 7/2004 | Lungwitz et al. | |
| 6,828,280 B2 | 12/2004 | England et al. | |
| 7,081,439 B2 * | 7/2006 | Sullivan et al. | 507/269 |
| 7,207,388 B2 * | 4/2007 | Samuel et al. | 166/294 |
| 7,265,079 B2 * | 9/2007 | Willberg et al. | 507/203 |
| 2003/0166471 A1 | 9/2003 | Samuel et al. | |
| 2003/0234103 A1 * | 12/2003 | Lee et al. | 166/293 |
| 2005/0252658 A1 | 11/2005 | Willingham et al. | |
| 2006/0041028 A1 | 2/2006 | Crews | |
| 2006/0211775 A1 | 9/2006 | Crews | |
| 2006/0211776 A1 | 9/2006 | Crews | |
| 2007/0056737 A1 | 3/2007 | Crews et al. | |

OTHER PUBLICATIONS

Halliburton, "K-Max-Plus™ Service," Product Bulletin, Dec. 2005.

T. Ito et al. in "Adsorption of Methane on Magnesium Oxide Studied by Temperature-Programmed Desorption and ab Initio Molecular Orbital Methods", The Journal of Physical Chemistry, 1991, vol. 95, pp. 4476-4483.

Onal, et al. in "Quantum Chemical Study of the Catalytic Oxidative Coupling of Methane", Industrial & Engineering Chemistry Research, 1997, vol. 36, pp. 4028-4032.

R. Bandyopadhyay, et al., "Effect of Silica Colloids on the Rheology of Viscoelastic Gels Formed by the Surfactant Cetyl Trimethylammonium Tosylate," Journal of Colloid and Interface Science 2005, pp. 585-591, vol. 283.

* cited by examiner

FIG. 1 - Leakoff tests with 400md ceramic disc at 250F and 300psi for different fluid loss agents
(Base Fluid: 13.0ppg Brine + 4%VES + 6pptg Stabilizer + 1gptg Breaker)

FIG. 3 - Leakoff tests with 400md ceramic disc at 150F and 300psi for different fluid loss agents
(Base Fluid: 4%VES + 3%Brine + 2gptg Breaker)

FIG. 4

FIG. 7 – Example 16

FIG. 6 – Example 15

FIG. 8 – Example 17

FLUID LOSS CONTROL AGENTS FOR VISCOELASTIC SURFACTANT FLUIDS

CROSS-REFERENCE TO RELATED APPLICATION

This application claims the benefit of U.S. Provisional Application No. 60/815,693 filed Jun. 22, 2006. and is a Continuation-in-Part of U.S. patent application Ser. No. 11/125,465 filed May 10, 2005, which in turn claims the benefit of U.S. Provisional Application No. 60/570,601 filed May 13, 2004.

TECHNICAL FIELD

The present invention relates to aqueous, viscoelastic fluids used during hydrocarbon recovery operations, and more particularly relates, in one non-limiting embodiment, to methods and additives for controlling the fluid losses thereof.

BACKGROUND

Hydraulic fracturing is a method of using sufficient pump rate and effective hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations.

Aqueous fluids gelled with viscoelastic surfactants (VESs) are also known in the art. VES-gelled fluids have been widely used as gravel-packing, frac-packing and fracturing fluids because they exhibit excellent rheological properties and are less damaging to producing formations than crosslinked polymer fluids. VES fluids are non-cake-building fluids, and thus leave no potentially damaging polymer cake residue. However, the same property that makes VES fluids less damaging tends to result in significantly higher fluid leakage into the reservoir matrix, which reduces the efficiency of the fluid especially during VES fracturing treatments. It would thus be very desirable and important to discover and use fluid loss agents for VES fracturing treatments in high permeability formations (SPE 31114).

T. Ito et al. in "Adsorption of Methane on Magnesium Oxide Studied by Temperature-Programmed Desorption and ab Initio Molecular Orbital Methods", *The Journal of Physical Chemistry*, 1991, Vol. 95, page 4476, examined chemisorption of methane on magnesium oxide clusters by means of ab initio molecular orbital methods. In this study it was shown that methane heterolytically dissociates on the nearest pair of three-coordinated surface magnesium and oxygen atoms which were the most active sites. I. Onal, et al. in "Quantum Chemical Study of the Catalytic Oxidative Coupling of Methane", *Industrial & Engineering Chemistry Research*, 1997, Vol. 36, pages 4028-4032, studied that the surface of MgO catalyst was modeled by a $Mg_9O_9$ molecular cluster containing structural defects such as edges and corners.

SUMMARY

There is provided, in one form, a method for treating a subterranean formation that involves an aqueous viscoelastic treating fluid. The fluid includes an aqueous base fluid, a viscoelastic surfactant (VES) gelling agent in an amount effective to increase the viscosity of the aqueous base fluid, and an amount of a fluid loss control agent effective to improve the fluid loss of the aqueous viscoelastic treating fluid as compared with an identical fluid absent the agent. The agent may be an alkaline earth metal oxide, an alkaline earth metal hydroxide, a transition metal oxide, a transition hydroxide, or a mixture thereof. The method involves injecting the aqueous viscoelastic surfactant treating fluid through a wellbore and to the subterranean formation; and treating the subterranean formation.

There is further provided in another non-limiting embodiment an aqueous viscoelastic treating fluid that includes an aqueous base fluid, a VES gelling agent, and an amount of fluid loss control agent effective to improve the fluid loss as compared with an identical fluid absent the agent. Again, the additive may be an alkaline earth metal oxide, an alkaline earth metal hydroxide, a transition metal oxide or transition metal hydroxide, or a mixture thereof. Again, the amount of the VES gelling agent is that effective to increase the viscosity of the aqueous base fluid, typically water or brine.

The fluid loss control agents (e.g. MgO and/or $MgOH_2$, and the like) appear to help develop a pseudo-filter cake of VES micelles by associating with them as well as ions and particles (in one non-restrictive explanation) to produce a novel and unusual viscous fluid layer of pseudo-crosslinked elongated micelles on the reservoir face that limits further VES fluid leak-off. Additionally, the art may be further advanced by use of nanometer-sized fluid loss control agents that also form a similar viscous fluid layer of pseudo-crosslinked micelles on the formation face that are equivalent to micron-sized fluid loss control agents herein in controlling rate of VES fluid loss, yet can be non-pore plugging and physically easier to produce back with the VES fluid after a VES treatment. That is, the effectiveness of the method is largely independent of the size of the fluid loss control agents. The use of MgO for fluid loss control also has utility over a broad range of temperature of about 70° F. to about 400° F. (about 21° C. to about 204° C.).

DETAILED DESCRIPTION

It has been discovered that the addition of alkaline earth metal oxides, such as magnesium oxide, and alkaline earth metal hydroxides, such as calcium hydroxide, to an aqueous fluid gelled with a VES improved the fluid loss of these brines. The fluid loss control agents herein are believed to be particularly useful in VES-gelled fluids used for well completion and/or stimulation. The VES-gelled fluids may further comprise proppants or gravel, if they are intended for use as fracturing fluids or gravel packing fluids, although such uses do not require that the fluids include proppants or gravel. It is especially useful that the fluid loss control agents are slowly soluble which permits their removal from the formation to be easy and complete maintaining little or no damage to the formation. In particular, the VES-gelled aqueous fluids have improved (reduced, diminished or prevented) fluid loss over a broad range of temperatures, such as from about 70 (about 21° C.) to about 400° F. (about 204° C.); alternatively up to about 350° F. (about 177° C.), and in another non-limiting embodiment up to about 300° F. (about 149° C.). Use of MgO and the like particles, as disclosed within U.S. Patent Application Publication 2005/0252658 A1 (Ser. No. 11/125,465, incorporated herein by reference in its entirety) is for high temperature stability of VES viscosity, and applies for temperature applications above about 190° F. (about 88° C.). The use of MgO and the like particles for the fluid loss control herein has application and functionality to much broader temperature range, such as from about 70° F. to about 400° F. (about 21° C. to about 204° C.), and may be used in low salinity monovalent brines, such as 3% KOI.

This discovery allows the VES system to have improved fluid loss to help minimize formation damage during well completion or stimulation operations. That is, the introduction of these additives to the VES-gelled aqueous system will limit and reduce the amount of VES fluid which leaks-off into the pores of a reservoir during a fracturing or frac-packing treatment, thus minimizing the formation damage that may occur by the VES fluid within the reservoir pores. Also, limiting the amount of VES fluid that leaks-off into the reservoir during a treatment will allow more fluid to remain within the fracture and thus less total fluid volume will be required for the treatment. Having less fluid leaking-off and more fluid remaining within the fracture will enable greater fracture size and geometry to be generated. Thus the use of these additives in a VES-gelled aqueous system will improve the performance of the VES fluid while lowering fracturing treatment cost.

Additionally, it has been discovered that the range in reservoir permeability does not significantly control the rate of fluid leaked-off when the additives described herein are within a VES fluid. Thus, the rate of leak-off in 2000 md reservoirs will be comparable to rate of leak-off in 100 and 400 md reservoirs. This enhanced control in the amount of fluid leaked-off for higher permeability reservoirs also expands the range in reservoir permeability to which the VES fluid may be applied. The expanded permeability range may allow VES fluids to be used successfully within reservoirs with permeabilities as high as 2000 to 3000 or more millidarcies (md). Prior VES-gelled aqueous fluids have reservoir permeability limitations of about 800 md, and even then they result in 2- to 4-fold volume of VES fluid leak-off rate as compared with the fluid loss control achievable with the methods and compositions herein.

Prior art VES-gelled aqueous fluids, being non-wall-building fluids (i.e. there is no polymer or similar material build-up on the formation face to form a filter cake) that do not build a filter cake on the formation face, have viscosity-controlled fluid leak-off into the reservoir. By contrast, the methods and compositions herein use a fluid loss agent that associates with the VES micelle structures through chemisorption or/and particle surface charge attraction, allowing pseudo-crosslinking of the elongated micelles to occur, in one non-limiting explanation of the mechanisms at work herein. This unique association has been found to form a highly viscous layer of crosslinked-like VES fluid on the formation face, thus acting as a pseudo-filter cake layer that limits and controls additional VES fluid from leaking-off into the reservoir pores. The pseudo-filter cake is composed of VES micelles that have VES surfactants with very low molecular weights of less than 1000. This is in contrast to and different from polymeric fluids that form true polymer mass accumulation-type filter cakes by having very high molecular weight polymers (1 to 3 million molecular weight) that due to their size are not able to penetrate the reservoir pores, but bridge-off and restrict fluid flow in the pores.

The fluid loss agents herein associate with the VES micelles and as VES fluid is leaked-off into the reservoir a viscous layer of micelles and fluid loss control particles and/or ions accumulate on the formation face, thus reducing the rate of VES fluid leak-off. It has been discovered that particulate plugging of the reservoir pores is not the mechanism of leak-off control or the mechanism that allows development of the viscous micelle layer. Tests using nanometer-sized fluid loss agents (on the order of $10^{-9}$ to $10^{-8}$ meters), that have no potential to bridge or plug reservoir pores of 1 md or higher reservoir permeability, still develop the viscous micelle layer. These materials still have the same or similar leak-off control-rate profiles (i.e. rate of fluid leak-off over time) as the 1 to 5 micron size fluid loss control particles useful for the compositions and methods herein that are larger. Thus, the size of the fluid loss agent is not a controlling and/or primary factor of methods and compositions herein, that is, to control VES fluid leak-off rate.

Figure 3:
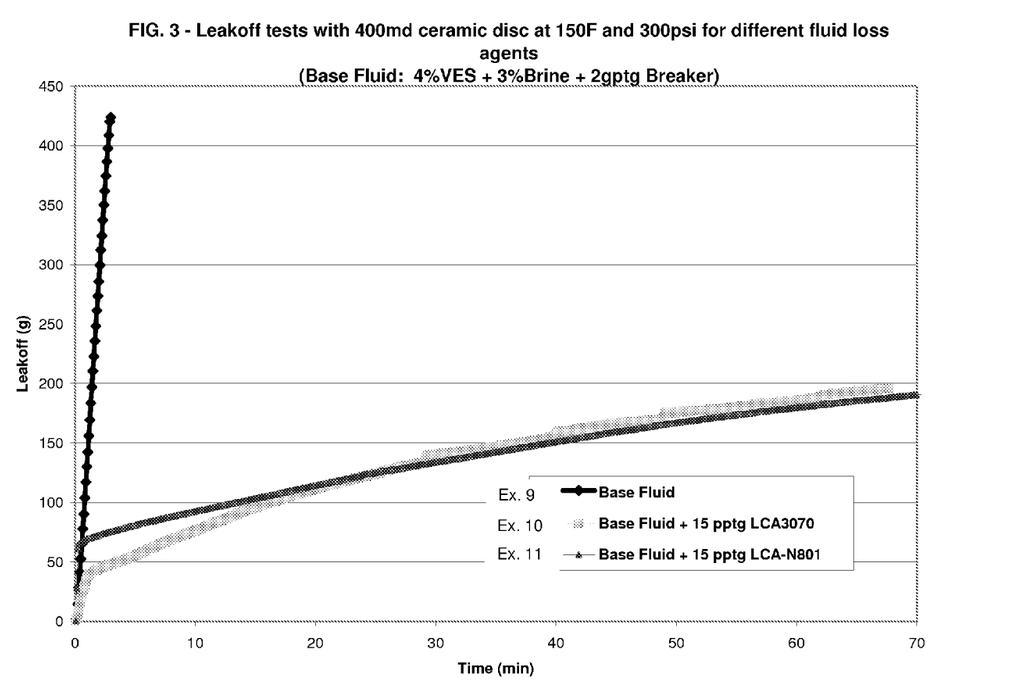
FIG. 3 is a graph of leakoff as a function of time for tests with 400 md ceramic discs at 150° F. (66° C.) and 300 psi (2.1 MPa) for different fluid loss control agents, where the base fluid included 3% brine, 4% VES and 2 gptg internal breaker.
Figure 6:
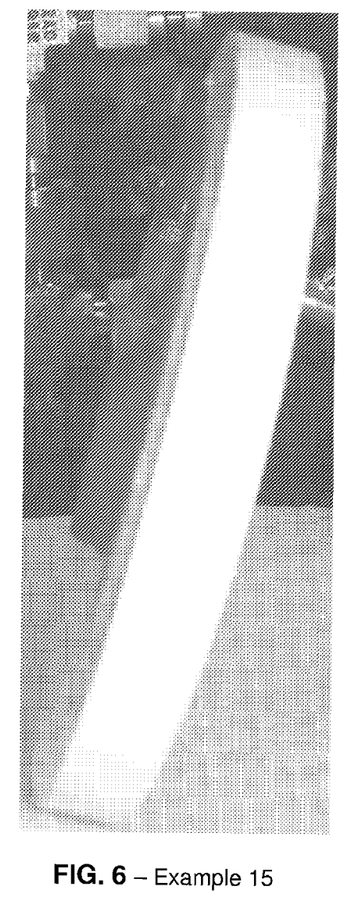
FIG. 6 is a photograph of a fluid loss disc that shows a side view of the pseudo-filter cake that forms during VES fluid leak-off when using micron-sized fluid loss control agents within the VES at 250° F. (121° C.), where the fluid was 13.0 ppg brine, 4% VES, 6 pptg stabilizer, 1 gptg internal breaker, and 10 pptg (1.2 kg/m$^3$) LCA3070.
Figure 7:
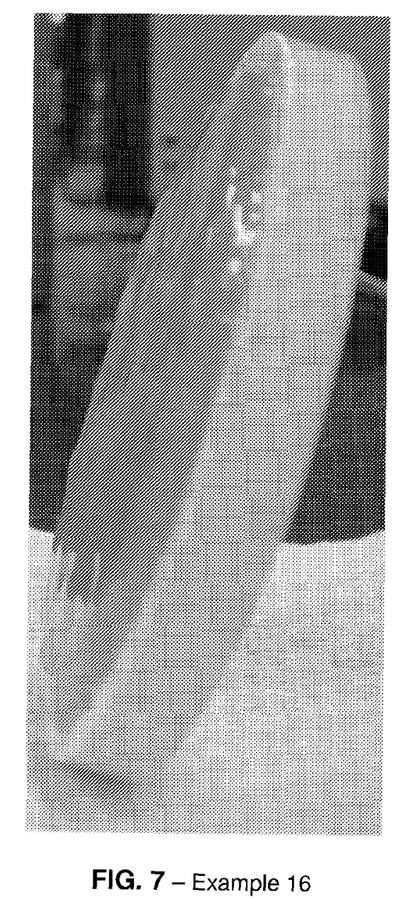
FIG. 7 is a photograph of a fluid loss disc that shows a side view of the pseudo-filter cake that forms during VES fluid leak-off when using nano-sized fluid loss control agents within the VES at 250° F. (121° C.), where the fluid was 13.0 ppg (1.6 kg/liter) brine, 4% VES, 6 pptg (0.7 kg/m$^3$) stabilizer, 1 gptg internal breaker, and 10 pptg (1.2 kg/m$^3$) LCA-N801.

FIG. 3 shows the leak-off volume over time for VES-gelled aqueous fluids with micron size MgO particles (LCA-3070) and for nano size MgO particles (LCA-N801). FIG. 3 shows nearly identical leak-off rates for use of micron- and nano-sized fluid loss control particles, thus showing that particle size is not a primary factor in controlling rate of fluid leak-off. FIGS. 6 and 7 show photos of the pseudo-filter cakes on fluid loss discs for micron and nano size fluid loss control agents. The photo with nano particles (FIG. 7) shows a viscous VES layer formed on the fluid loss disc. It is the formation of this viscous layer of VES micelles and fluid loss control agent that limits the rate of further VES fluid leak-off through the disc, even for nano-sized fluid loss control agents used within the VES-gelled aqueous fluid.

In the methods described herein, an aqueous fracturing fluid, as a non-limiting example, is first prepared by blending a VES into an aqueous fluid. The aqueous base fluid could be, for example, water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the completion fluid, for a non-limiting example.

The aqueous fluids gelled by the VESs herein may optionally be brines. In one non-limiting embodiment, the brines may be prepared using salts including, but not necessarily limited to, NaCl, KCl, $CaCl_2$, $MgCl_2$, $NH_4Cl$, $CaBr_2$, $NaBr_2$, sodium formate, potassium formate, and other commonly used stimulation and completion brine salts. The concentration of the salts to prepare the brines can be from about 0.5% by weight of water up to near saturation for a given salt in fresh water, such as 10%, 20%, 30% and higher percent salt by weight of water. The brine can be a combination of one or more of the mentioned salts, such as a brine prepared using NaCl and $CaCl_2$ or NaCl, $CaCl_2$, and $CaBr_2$ as non-limiting examples.

The viscoelastic surfactants suitable for use herein may include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $R^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include ClearFRAC™, which may also comprise greater than 10% of a glycol. This patent is incorporated herein in its entirety by reference. One preferred VES is an amine oxide. As noted, a particularly preferred amine oxide is tallow amido propylamine oxide (TAPAO), sold by Baker Oil Tools as SurFRAQ™ VES. SurFRAQ is a VES liquid product that is 50% TAPAO and 50% propylene glycol. These viscoelastic surfactants are capable of gelling aqueous solutions to form a gelled base fluid. The additives herein may also be used in Diamond FRAQ™ which is a VES system, similar to SurFRAQ, which contains VES breakers sold by Baker Oil Tools.

The amount of VES included in the fracturing fluid depends on two factors. One involves generating, creating or producing enough viscosity to control the rate of fluid leak off into the pores of the fracture, which is also dependent on the type and amount of fluid loss control agent used, and the second involves creating, generating or producing a viscosity high enough to develop the size and geometry of the fracture within the reservoir for enhanced reservoir production of hydrocarbons and to also keep the proppant particles suspended therein during the fluid injecting step, in the non-limiting case of a fracturing fluid. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the range is from about 1.0 to about 6.0% by volume VES product. In an alternate, non-restrictive form, the amount of VES ranges from 2 to about 10 volume %.

The fluid loss control agents useful herein include, but are not necessarily limited to, slowly soluble alkaline earth metal oxides or alkaline earth metal hydroxides, transition metal oxides, transition metal hydroxides, or mixtures thereof. In one non-limiting embodiment, the alkali earth metal and transition metals in these additives may include, but are not necessarily limited to, magnesium, calcium, barium, strontium, aluminum, zirconium, vanadium, molybdenum, manganese, iron, cobalt, nickel, palladium, copper, zinc, tin, antimony, titanium, combinations thereof and the like. In one non-restrictive version, the transition metals such as copper, tin, nickel, and the like may be used in relatively low concentration compared to or in combination with the alkaline earth metals. In one non-restrictive embodiment, the amount of additive ranges from about 2 to about 200 pounds per thousand gallons (pptg) (about 0.2 to about 24 kg/m$^3$) based on the aqueous viscoelastic treating fluid. In another non-restrictive embodiment, the amount of additive may have a lower limit of about 6 pptg (about 0.7 kg/m$^3$) and independently an upper limit of about 80 pptg (about 9.6 kg/m$^3$), and in another non-restrictive version a lower limit of about 8 pptg (about 1 kg/m$^3$) and independently an upper limit of about 40 pptg (about 4.8 kg/m$^3$), and in still another non-limiting embodiment, a lower limit of about 10 pptg (about 1.2 kg/m$^3$) and independently an upper limit of about 25 pptg (about 3 kg/m$^3$).

The amount of transition metal oxides or transition metal hydroxides may range from about 0.0001 pptg (about 0.01 g/m$^3$) independently to an upper limit of about 4 pptg (about 0.45 kg/m$^3$), and in another non-restrictive version from about 0.1 pptg (about 12 g/m$^3$) independently up to about 0.5 pptg (about 60 g/m$^3$). In another non-limiting embodiment, the particle size of the fluid loss control agents ranges between about 1 nanometer independently up to about 0.2 millimeter. In another non-limiting embodiment, the particle size of the fluid loss control agents ranges between about 4 nanometers independently to about 74 microns. The fluid loss control agents may be added along with the VES fluids. In another non-restrictive version the fluid loss control agents may have a surface area of between about 10 to about 700 square meters per gram (m$^2$/g).

It turns out that the particle size distribution of magnesium oxide is probably not a major factor for fluid loss control in VES-gelled fluids. In one non-limiting explanation, it appears that there are two primary mechanisms that make magnesium oxides (and the other materials) good candidates for fluid loss control agents in VES-gelled fluids. The first mechanism may involve chemisorption formed with magnesium oxide and the fatty amine found in the VES. The chemisorption formed with magnesium oxide particles associating with the long chain hydrocarbons will easily form a plug for a porous formation to control VES-gelled fluid loss. The second mechanism is that magnesium oxide molecular clusters may contain inherited structural defects to generate extra positive charges on the surface of the magnesium oxide molecular clusters. These positive charges will attract to the anionic part in the micelle of VES-gelled fluids and form a larger particle that plugs the pore throats of porous formation to reduce the VES fluid loss. The chemisorption and/or surface charges of magnesium oxide particles associating with the micelles of VES-gelled fluids form a viscous layer or a pseudo-cake on the rock surface to block fluid flowing into the rock. Another advantage for magnesium oxide and the other agents being a good fluid loss agent in VES-gelled fluids is that they are slowly soluble compounds in these systems (e.g. solubility of MgO in water is less than 0.9 milligram per liter of water at ambient temperature), which means that after the VES-gelled fluid treatments, the magnesium oxide (e.g.) will be dissolved into VES-gelled fluids and/or the formation fluids and may be removed during production; therefore, minimizing formation damage that can occur as compared with other known fluid loss control additives or systems (see FIG. 5).

The solubility of the fluid loss control agents is believed to be complex. For instance, the total amount of MgO particles solubilized may be from about 0.0001 to about 0.2 wt %, while the rest may remain as solid particles in a solubility equilibrium in the fluid, although the inventors do not wish to be limited to any particular explanation. The factors that may affect or control the solubility rate and total amount equilibrium include, but are not necessarily limited to, chemical composition, chemical structure, particle or aggregate structure, particle size, hard versus light burns in manufacturing (i.e. degree and duration of heating), fluid salinity, and fluid temperature. In some cases, the compounds may remain as solid particles or at least particles much longer, such as special nano-sized MgO particles with unique crystal compound and aggregate structures. These may be much less soluble and would dissolve at relatively slower rates. Other MgO and nano MgO particles may be faster to dissolve and more total amount will be solubilized; thus there may be a very broad range in rate and amount of solubility. In one non-limiting embodiment an estimate may be that for some MgO products a small portion (about 0.005 to about 0.02 wt %) will solubilize within 1 to 2 minutes (for instance, it has been noticed the water pH increases quickly upon MgO addition) with then another portion continuing to be solubilized until a solubility equilibrium is apparently reached in about 2 to 8 hours. In some non-restrictive versions, the total amount solubilized may be from about 0.1 to about 2.0 wt %. The rate and amount of solubility within mid- to high-salinity fluids may thus be rather complex, for example in one non-limiting explanation it may be that overall a lower solubility rate and amount occurs in saline fluids, e.g. about 11.0 ppg (about 1.3 kg/liter) $CaCl_2$ and about 14.0 ppg (about 1.7 kg/liter) $CaBr_2$. With increasing fluid temperature it may be that the solubility rate increases and the solubility equilibrium is shifted to where more total amount can be solubilized, such as at a fluid temperature of about 250° F. (about 121° C.).

In hydraulic fracturing applications, propping agents are typically added to the base fluid after the addition of the VES. Propping agents include, but are not limited to, for instance, quartz sand grains, glass and ceramic beads, bauxite grains, walnut shell fragments, aluminum pellets, nylon pellets, and the like. The propping agents are normally used in concentrations between about 1 to 14 pounds per gallon (120-1700 kg/m$^3$) of fracturing fluid composition, but higher or lower concentrations can be used as the fracture design requires. The base fluid can also contain other conventional additives common to the well service industry such as water wetting surfactants, non-emulsifiers and the like. In the methods and compositions herein, the base fluid can also contain additives which can contribute to breaking the gel (reducing the viscosity) of the VES fluid.

While the viscoelastic fluids are described most typically herein as having use in fracturing fluids, it is expected that they will find utility in completion fluids, gravel pack fluids, fluid loss pills, lost circulation pills, diverter fluids, foamed fluids, stimulation fluids and the like.

In another non-limiting embodiment, the treatment fluid may contain other viscosifying agents, other different surfactants, clay stabilization additives, scale dissolvers, biopolymer degradation additives, and other common and/or optional components.

In a useful, non-restrictive embodiment herein, use with internal VES breakers can have synergistic clean-up effects for the fluid loss control agent and the VES fluid. Use of these compositions with an internal breaker may allow less VES fluid to leak-off into the reservoir, thus resulting in less fluid needed to be broken and removed once the treatment is over. Additionally, use of an internal breaker within the VES micelles may further enhance the breaking and removal of the pseudo-filter cake viscous VES layer that develops on the formation face with the fluid loss agents herein. Lab tests to date appear to show that the viscous VES pseudo-filter cake has the micelles readily broken down to the relatively nonviscous, more spherically-shaped micelles by use of an internal breaker, and also with use of encapsulated breaker, if used.

The proppant, solid particle or gravel may be any solid particulate matter suitable for its intended purpose, for example as a screen or proppant, etc. Suitable materials include, but are not necessarily limited to sand, sintered bauxite, sized calcium carbonate, other sized salts, ceramic beads, and the like, and combinations thereof. These solids may also be used in a fluid loss control application.

The invention will be further described with respect to the following Examples which are not meant to limit the invention, but rather to further illustrate the various embodiments.

EXAMPLES

Figure 1:
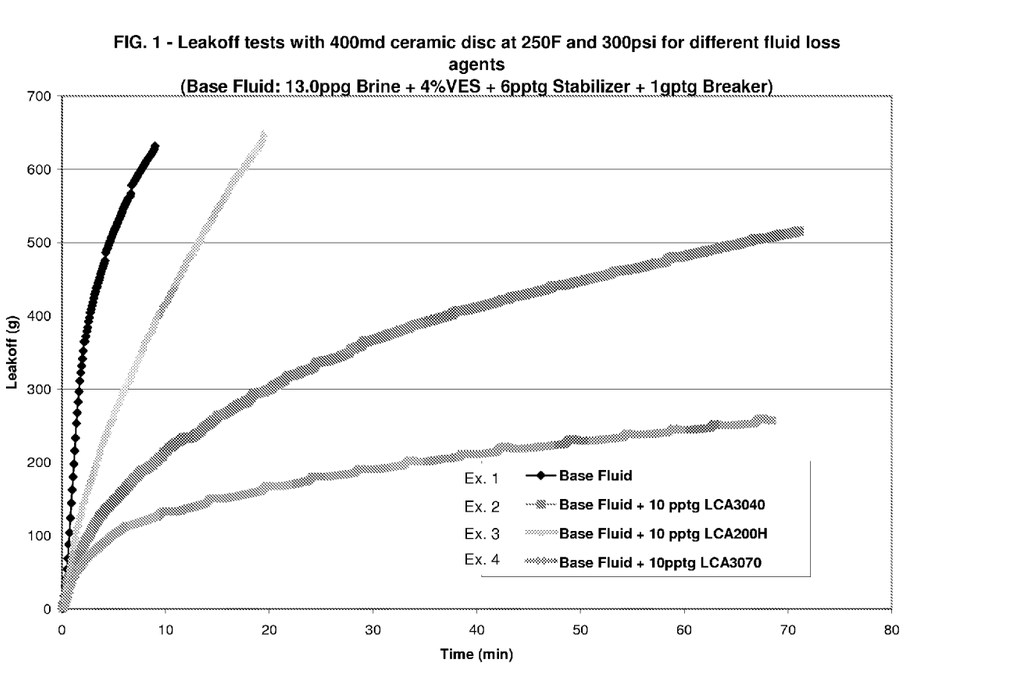
FIG. 1 is a graph of leakoff as a function of time for tests with 400 md ceramic discs at 250° F. (121° C.) and 300 psi (2.1 MPa) for different fluid loss control agents, where the base fluid was 13.0 ppg (1.6 kg/liter) brine, 4% VES, 6 pptg (0.7 kg/m$^3$) stabilizer and 1 gptg internal breaker (SI units of gallons per thousand gallons have the same value for any convenient SI unit; e.g. liters per thousand liters or m$^3$/1000 m$^3$, etc.)
Figure 2:
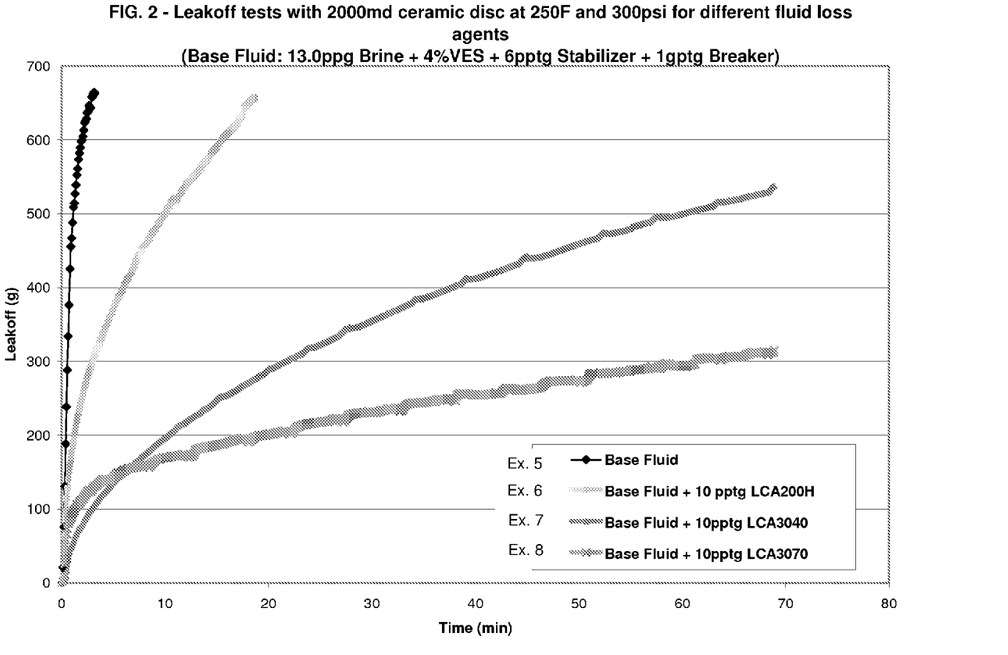
FIG. 2 is a graph of leakoff as a function of time for tests with 2000 md ceramic discs at 250° F. (121° C.) and 300 psi (2.1 MPa) for different fluid loss control agents, where the base fluid was 13.0 ppg brine (1.6 kg/liter), 4% VES, 6 pptg (0.7 kg/m$^3$) stabilizer and 1 gptg internal breaker.

Table I shows the typical composition and physical properties of three magnesium oxide agents available from Martin Marietta Magnesia Specialties, in which LCA200H is MagChem10-200, LCA3040 is MagChem40, and LCA3070 is MagChem HSA-10. A series of lab tests show that these new fluid loss control agents can be successfully used to improve control fluid leakage. Leakoff or fluid loss tests were followed using the API RP39 (American Petroleum Institute Recommendation Procedure) test procedure. FIGS. 1 (Examples 1-4) and 2 (Examples 5-8) show the fluid loss control with VES fluids at 250° F. (121° C.) for 400 md and 2000 md ceramic discs, respectively. In FIG. 3 (Examples 9-11), LCA-N801 is nano MgO powder with a composition of 99.9% magnesium oxide having a mean particle size of 35 nanometers, which is the product #12N-0801 of Inframat Advanced Materials LLC. The fluid loss control at 150° F. (66° C.) is shown in FIG. 3. The leakoff test results showed that adding MgO into VES fluids can significantly reduce fluid loss.

Figure 4:
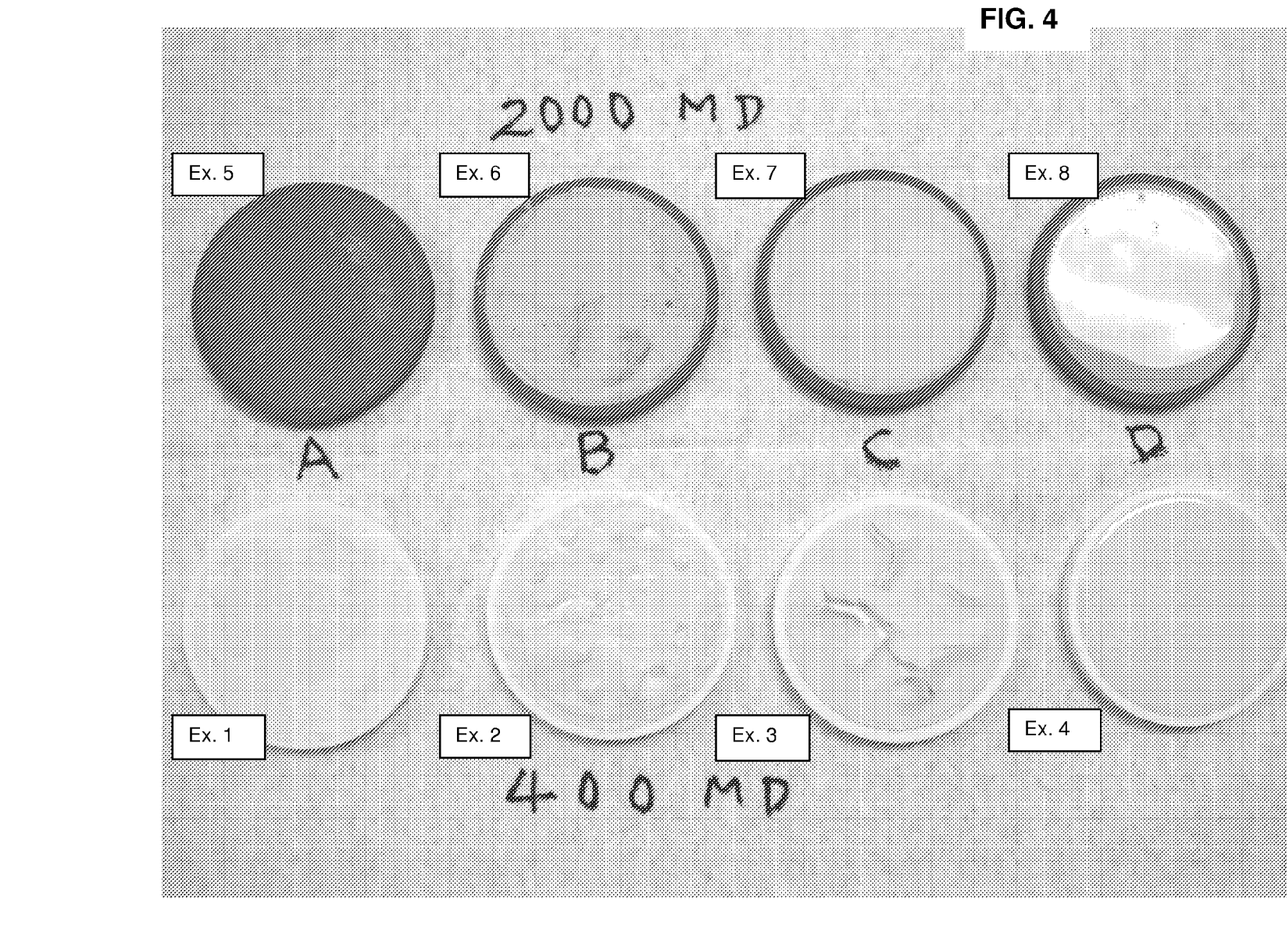
FIG. 4 is a photograph of 8 discs, where the top 4 are those used in the FIG. 2 experiments and the bottom 4 are those used in the FIG. 1 experiments.

FIG. 4 is a picture of filter cake building on ceramic discs through adding fluid loss agent MgO in VES fluids at 250° F. (121° C.) (Examples 1-8). The conditions of the Leakoff Tests for the discs shown in FIG. 4 were 250° F. (121° C.) and 300 psi (2.1 MPa) for VES fluids with different fluid loss control agents. The letter designations in FIG. 4 refer to the following:

A: Base Fluid: 13.0 ppg Brine (1.6 kg/liter)+4% VES+6 pptg (0.7 kg/m$^3$) Stabilizer+1 gptg Breaker;
B: Base Fluid (A)+10 pptg (1.2 kg/m$^3$) LCA200H;
C: Base Fluid (A)+10 pptg (1.2 kg/m$^3$) LCA3040; and
D: Base Fluid (A)+10 pptg (1.2 kg/m$^3$) LCA3070.

Figure 5:
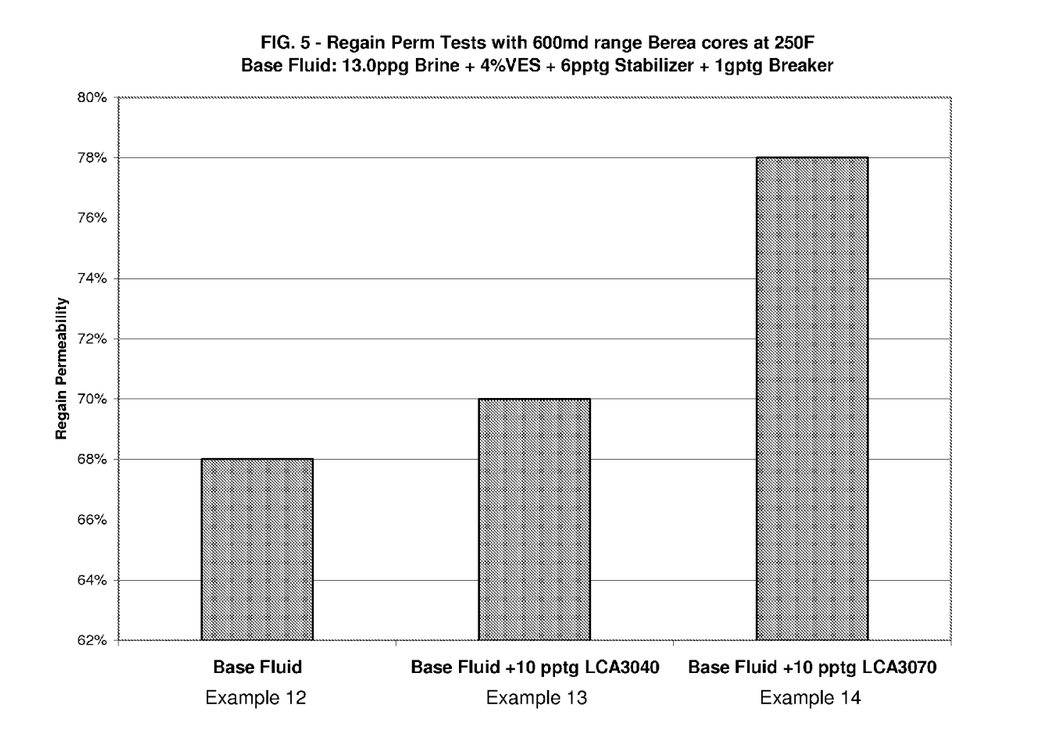
FIG. 5 is a chart of regain permeability tests with 600 md range Berea cores at 250° F. (121° C.), where the base fluid was 13.0 ppg (1.6 kg/liter) brine, 4% VES, 6 pptg (0.7 kg/m$^3$) stabilizer and 1 gptg internal breaker, as in FIG. 1.

The results of core flow tests were reported in FIG. 5 (Examples 12-14). The core flow results demonstrated that MgO can increase regain permeability of VES fluids.

The schedule for the core flow tests of FIG. 5 was the following:

1. A Berea core was saturated with 3% KCl and mounted into a core holder.
2. The core was heated to the desired temperature while pumping 3% KCl through the core with a 2 ml/min flow rate and maintaining the system pressure at 200 psi (1.4 MPa).
3. At the desired temperature, the initial permeability (perm) was measured with 3% KCl in the production direction.
4. Closed outlet valve in the injection direction, the VES-gelled fluids containing fluid loss agent MgO were pumped in injection direction with a 3 ml/min flow rate to increase pressure differential across the core to 1000 psi (6.9 MPa), then opened the outlet valve in the injection direction.
5. Continued pumping for 5 minutes, then stopped pumping and closed all valves.
6. The core was soaked for 12 hours.
7. The perm of the core was measured again in the production direction with 3% KCl, the regain permeability is a ratio of the perm and the initial perm.

FIG. 6 is a photograph of filter cake built on 400 md ceramic discs through adding LCA-3070 fluid loss agent MgO in VES fluids at 250° F. (121° C.) (Example 15). The conditions of the Leakoff Test for the disc shown in FIG. 6 were 250° F. (about 121° C.) and 300 psi (2.1 MPa). The photo shows how the VES fluid deposited a viscous layer of fluid loss agent and VES micelles.

FIG. 7 is a photograph of filter cake built on 400 md ceramic discs through adding 35 nanometer-sized fluid loss agent MgO (LCA-N801) in VES fluids at 250° F. (about 121° C.) (Example 16). The conditions of the Leakoff Test for the disc shown in FIG. 7 were 250° F. (about 121° C.) and 300 psi (2.1 MPa). The photograph appears to show how the VES fluid deposited a clear viscous layer of fluid loss agent and VES micelles. This photo also appears to demonstrate that fluid loss particles that are smaller than the pores of the fluid loss disc associate with the VES micelles to form a pseudo-crosslinked VES-gelled fluid layer that limits VES fluid leakoff through the pseudo-filter cake layer. It appears that the size of the fluid loss particle may not be the primary factor for controlling VES fluid loss or the development of a viscous pseudo-filter cake VES fluid layer on cores, discs, and reservoirs.

Figure 8:
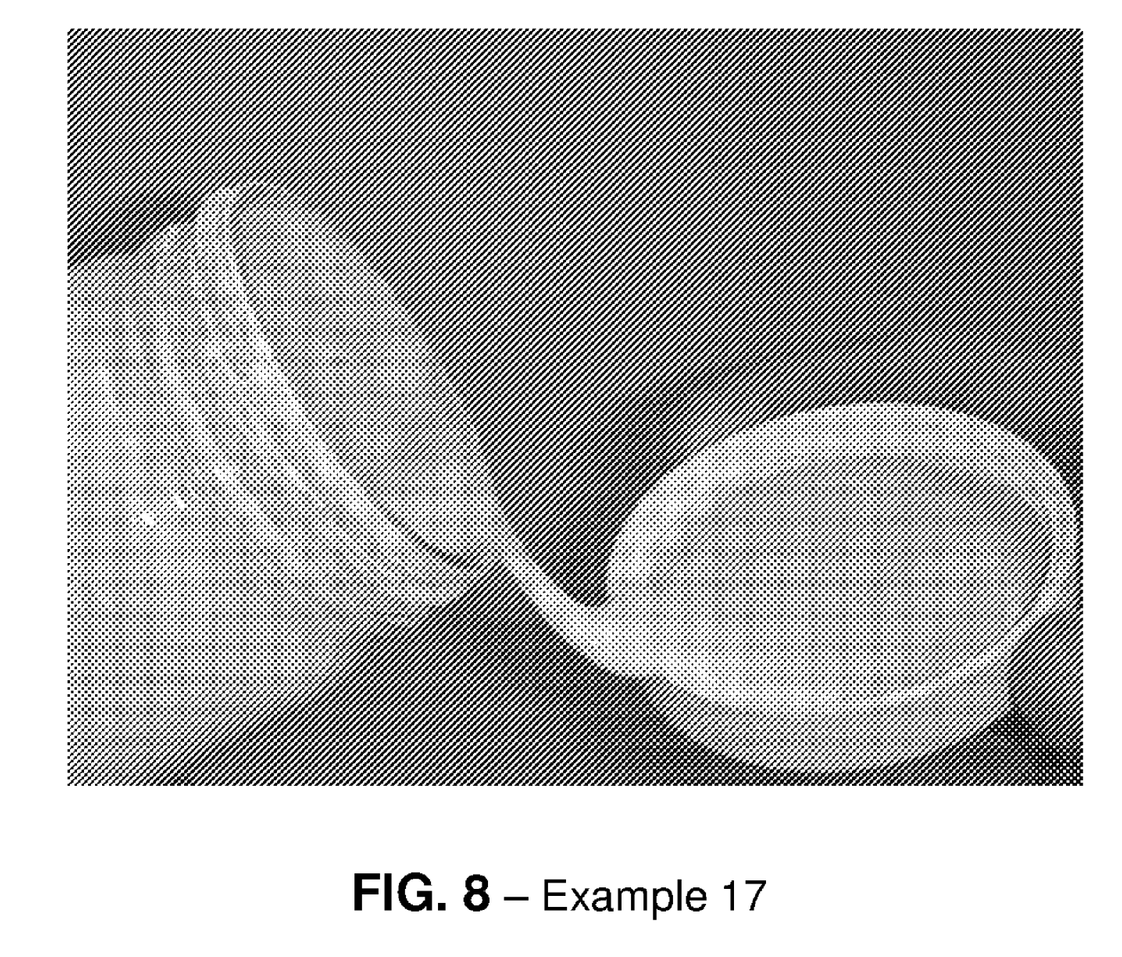
FIG. 8 is a photograph of the pseudo-crosslink appearance that VES fluid where with the fluid loss control agent herein is present.

FIG. 8 is a photograph of VES fluid (Example 17) with a high dose of MgO has been added. The photo shows the VES fluid appears to be like a crosslinked polymer type fluid, but is not; the fluid viscosity is based on VES micelles. The stringy viscosity seen appears to indicate the MgO particles and/or MgOH$_2$ ions or particles associate the VES micelles together as a pseudo-crosslinker.

TABLE I

Typical Composition and Physical Properties of Fluid Loss Control Agents

|  |  | LCA 200H | LCA 3040 | LCA 3070 |
|---|---|---|---|---|
| Composition | MgO % | 98.2 | 98.2 | 98.5 |
|  | CaO % | 0.9 | 0.8 | 0.8 |
|  | SiO$_2$ % | 0.4 | 0.35 | 0.35 |
|  | Fe$_2$O$_3$ % | 0.2 | 0.15 | 0.20 |
|  | Al$_2$O$_3$ % | 0.1 | 0.1 | 0.15 |
|  | Chloride (Cl) % | 0.01 | 0.35 | 0.35 |
|  | SO$_3$ % | 0.01 | 0.05 | 0.05 |
| Physical Properties | Mean particle size, microns | 10 | 5 | 1 |
|  | Passing 200 mesh (75 μm), % | 95 |  |  |
|  | Passing 325 mesh (45 μm), % |  | 99.2 | 99.8 |

In the foregoing specification, the invention has been described with reference to specific embodiments thereof, and has been demonstrated as effective in inhibiting fluid loss for surfactant gelled fluids. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, viscoelastic surfactants, alkaline earth metal oxides and alkaline earth metal hydroxides and other components falling within the claimed parameters, but not specifically identified or tried in a particular composition, are anticipated to be within the scope of this invention.

What is claimed is:

1. An aqueous viscoelastic treating fluid comprising:
an aqueous base fluid;

a viscoelastic surfactant (VES) gelling agent; and an amount of fluid loss control agent effective to improve the fluid loss of the aqueous viscoelastic treating fluid as compared with an identical fluid absent the agent, where the fluid loss control agent is selected from the group consisting of alkaline earth metal oxides or hydroxides selected from the group consisting of oxides or hydroxides of magnesium, calcium, strontium, barium and mixtures thereof;

transition metal oxides or hydroxides selected from the group consisting of oxides or hydroxides of vanadium, molybdenum, manganese, iron, cobalt, nickel, palladium, copper, zinc, titanium and mixtures thereof;

transition metal hydroxides selected from the group consisting of aluminum, zirconium, tin, antimony and mixtures thereof; and combinations thereof, where the fluid loss control agent has a size ranging from about 1 nanometer to 5 microns.

2. The aqueous viscoelastic treating fluid of claim 1 where the aqueous base fluid is brine.

3. The aqueous viscoelastic treating fluid of claim 1 where the effective amount of the fluid loss control agent ranges from about 2 to about 200 pptg based on the aqueous viscoelastic treating fluid.

4. The aqueous viscoelastic treating fluid of claim 1 where the fluid loss control agent is magnesium oxide.

5. The aqueous viscoelastic treating fluid of claim 1 where the agent has a size ranging from about 1 nanometer to 1 micron.

6. An aqueous viscoelastic treating fluid comprising:

an aqueous brine base fluid;

a viscoelastic surfactant (VES) gelling agent; and about 2 to about 200 pptg based on the aqueous viscoelastic treating fluid of a fluid loss control agent, where the fluid loss control agent is selected from the group consisting of alkaline earth metal oxides or hydroxides selected from the group consisting of oxides or hydroxides of magnesium, calcium, strontium, barium and mixtures thereof;

transition metal oxides or hydroxides selected from the group consisting of oxides or hydroxides of vanadium, molybdenum, manganese, iron, cobalt, nickel, palladium, copper, zinc, titanium and mixtures thereof;

transition metal hydroxides selected from the group consisting of aluminum, zirconium, tin, antimony and mixtures thereof; and combinations thereof, where the fluid loss control agent has a size ranging from about 1 nanometer to 5 microns.

7. The aqueous viscoelastic treating fluid of claim 6 where the fluid loss control agent is magnesium oxide.

* * * * *